United States Patent Office 3,441,596
Patented Apr. 29, 1969

3,441,596
PROCESS FOR PRODUCING POLYESTERS OF MONOTHIODIPOLYCARBOXYLIC ACIDS
Charles Kezerian, Orinda, Calif., assignor to Stauffer Chemical Company, New York, N.Y., a corporation of Delaware
No Drawing. Filed July 24, 1964, Ser. No. 385,039
Int. Cl. C07c 139/00
U.S. Cl. 260—481                                    5 Claims

ABSTRACT OF THE DISCLOSURE

A process for producing polyesters of monothiodipolycarboxylic acids by reacting under substantially anhydrous conditions hydrogen sulfide with a polyester of an α,β-unsaturated olefinic polycarboxylic acid in a liquid phase said hydrogen sulfide being maintained in the liquid phase of said polyester in an essentially saturated state, in the presence of an alkali metal alkoxide at a temperature of about —10° C. to about 50° C., and recovering from the resultant reaction mixture the polyester of a monothiodipolycarboxylic acid thereby produced.

---

This invention relates to an improved process for the preparation of polyesters of thiopolycarboxylic acids. More particularly, it relates to the preparation of polyesters of thiotetracarboxylic acids whereby unexpected yields of said polyesters may be obtained under very mild conditions with an improved catalyst.

Polyesters of thiopolycarboxylic acids are known and have been described in the literature. Especially, the preparation and chemical properties of the polyesters of the lower-thiopolycarboxylic acids have been studied and described in the prior art. The novel properties of these compounds permits their use in a variety of applications. For example, it is known that they have utility as plasticizers for certain resins. Also the compounds of the present invention find particular utility as additives in combination with certain phenolic anti-oxidants to impart improved stabilization protection against oxidative deterioration of polymeric materials herein included, as shown in our co-pending application Ser. No. 347,358, filed Feb. 26, 1964, now abandoned.

Prior art teaches the preparation of the instant compounds by reacting a diester of an α,β-unsaturated dicarboxylic acid and especially those having conjugated double bonds, the conjugation being with the carbonyl group, or a corresponding triester of an α,β-unsaturated olefinic tricarboxylic acid, with hydrogen sulfide at a temperature between 0° C. and 300° C. The prior art reaction can be carried out with or without a basic condensation catalyst. The catalysts which are suitable for use are the relatively strongly basic organic compounds such as secondary and tertiary amines. When no catalyst is used superatmospheric pressure and long reaction times are required to effect reaction. When a catalyst as described by the prior art is used the reaction is somewhat faster and moderate heating is required to complete the reaction. In many cases the products are colored, which offer difficulty in decolorizing. The decolorizing technique usually employed requires distillation by means of a molecular still because of the high boiling nature of the members of the series. The known methods as described above leave room for improvement whereby the thioesters may be prepared in more rapid reactions, under very mild conditions, to yield pure and colorless products.

It has been found that the aforementioned esters of thiopolycarboxylic acids can be easily prepared by reacting α,β-unsaturated dicarbonyl diesters or a corresponding triester of an α,β-unsaturated olefinic tricarboxylic acid with hydrogen sulfide in the presence of alkali metal alkoxides at a temperature within the range between 0° C. and 50° C., thus accomplishing a relatively rapid and improved method of manufacture. To support the above-mentioned and related objectives of the invention, the steps and conditions are hereinafter described.

The improved method of the present invention describes the preparation of compounds corresponding to the formula

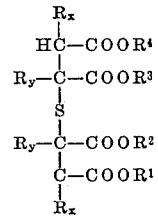

wherein $R_x$ may be either hydrogen, alkyl, a —$CH_2COOR^1$ group or a —CH(alkyl)$COOR^1$ group; $R_y$ may be either hydrogen, a lower alkyl group or a —CH(alkyl)$COOR^1$ group and combinations thereof of $R_x$ and $R_y$, $R_y$ being hydrogen, or a lower alkyl when $R_x$ is either —$CH_2COOR^1$ or —CH(alkyl)$COOR^1$, and $R_x$ being hydrogen, or an alkyl group when $R_y$ is —CH(alkyl)$COOR^1$ and $R^1$, $R^2$, $R^3$ and $R^4$ are the same or different alkyl, aralkyl, cycloalkyl, alkoxyalkyl, arloxyalkyl, halogenated alkyl, or alkylene groups.

The reaction of hydrogen sulfide and the α,β-unsaturated polyester may be conducted in the presence of an inert organic solvent. The use of such a solvent is particularly desirable when the ester of the α,β-unsaturated acid is a solid or when the product thioester is a solid. Normally the ester may be used as its own solvent without the need for an organic solvent. When such ester is poor solvent for the catalyst or for hydrogen sulfide, a suitable solvent will facilitate the reaction. Suitable solvents include aromatic hydrocarbons such as benzene, ethers such as dioxane, diethyl ether, complex ethers and oxides or inner ethers of the form

wherein R and R' may be divalent aliphatic radicals.

Catalysts suitable for use in carrying out the reaction include the alkali metal alkoxides. Although any alkali metal alkoxide of the form MOR, wherein M is an alkali metal and R is an alkyl radical, can be used as a catalyst, the preferred catalyst is sodium methoxide. The preferred catalyst is the most economically feasible. The selected alkali metal alkoxide catalyst can be used either in the dry powdered form or as a solution of the alkoxide in alcohol. The latter is preferred for ease of handling in addition to ease of preparation. Due to the hydrolytic instability of the catalyst the reaction must be performed under anhydrous conditions.

The reactants of the improved process within the embodiment of the present invention are hydrogen sulfide, a diester of an α,β-unsaturated dicarboxylic acid or a triester of an α,β-unsaturated tricarboxylic acid. Among the polyesters may be mentioned the corresponding di- and triesters of alkyl, aralkyl, cycloalkyl, alkoxyalkyl, halogenated alkyl, aryloxyalkyl, and alkylene groups. Such acids include maleic and fumaric acids; methylene malonic and ethylidene malonic acids; methylmaleic acid and ethylmaleic acid; itaconic acid and mesaconic acid, and the tricarboxylic such as aconitic acid and α- and γ-alkyl aconitic acids, and a catalyst of alkali metal alkoxide.

The reaction will proceed at almost any temperature; however, a range of between −10° C. and 50° C. places the reaction rate at an easily attainable and a commercially practical one that can be performed at atmospheric pressure. The reaction can also be carried out at superatmospheric pressures wherein the charge of hydrogen sulfide is sealed into a pressure vessel with the selected ester in the presence of the selected catalyst, thereby utilizing completely the charge of hydrogen sulfide. The reaction can be conveniently run at atmospheric pressure at a temperature range of −10° C. to +50° C., with the preferred range from about 15° C. to 25° C. Higher temperatures may be used at atmospheric pressure; however, when the temperature rises over 30–35° C. there is some color formation that increases with increasing temperature. The color formation at the higher temperatures is undesirable and is difficult to remove by conventional decolorization means.

In carrying out the process of the present invention the order of addition of reactants is of prime importance. In the preferred practice of the invention, first the unsaturated ester is added alone or in a suitably selected inert solvent to the reaction vessel. The material in the reactor is then saturated with dry hydrogen sulfide. Thereafter the reaction mixture must be kept saturated with dry hydrogen sulfide to the completion of the reaction while between .01 to 1.0 mole percent sodium methoxide is slowly added to the stirred solution. During the addition heat of reaction is evolved which requires that the solution be cooled in order to keep the temperature between 15° to 25° C. The resultant product is diluted with an inert organic solvent and washed successively with portions of water, sodium hydroxide and hydrochloric acid. The solvent is removed after drying over a drying agent such as calcium chloride. The remaining fraction is essentially pure product of a polyester of a saturated thiodi-(polycarboxylic) acid.

The concentration of the catalyst and the time for reaction are mutually dependent one on the other. Concentrations of alkali metal alkoxide higher than those recommended herein give a very rapid exothermic reaction which is difficult to control. Less catalyst than that mentioned above will give extremely slow rates of reaction. At the same time, if the catalyst is added prior to the addition of any hydrogen sulfide a very rapid exothermic reaction occurs, forming highly colored impurities. These colored impurities cannot be easily washed out of the final product.

By the behavior of the reactants mentioned above it is believed that the corresponding alkali metal hydrosulfide is actually the active reacting species of catalyst, formed in situ in the anhydrous reaction media. This can be represented by the following equations:

$$MOR + H_2S \rightleftarrows MSH + ROH \qquad (1)$$

 (2)

 (3)

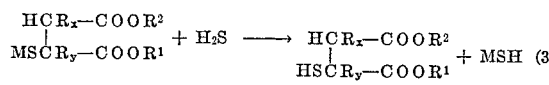

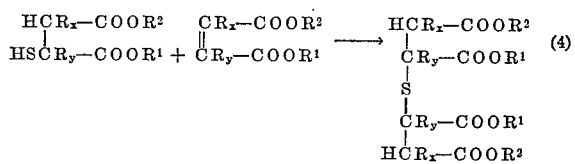 (4)

wherein R, $R^1$, $R^2$, $R_x$, $R_y$ and M represent radicals previously mentioned. Since free alkali metal alkoxides do react alone with α,β-unsaturated polycarboxylic esters to yield undesirable chromogenic compounds, it is necessary to keep the system saturated with hydrogen sulfide during the addition of alkali metal alkoxide. Equation 1 must be favored to yield alkali metal hydrosulfide in order for the reaction to proceed at a moderate rate to form the desired thiodipolycarboxylic acid ester. The over-all reaction as represented by Equations 1–4 above can be summarized as follows:

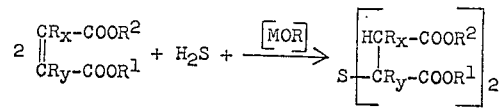

The final product therefore consists essentially of the thiodipolycarboxylic acid ester with very little impurity.

The following examples illustrate the preparation of thiodipolycarboxylic acid esters in accordance with the process herein described.

EXAMPLE 1

Preparation of tetraethyl thiodisuccinate

Diethyl maleate 344 g. (2 moles) was rapidly stirred while cooling to 15° C. The cooled material was saturated with hydrogen sulfide by diffusing the gas through the stirred solution. While maintaining hydrogen sulfide saturation of the diethyl maleate, 10 ml. of 25 percent sodium methoxide (0.043 mole) in methanol was added dropwise. The temperature of the reaction media during the addition of the catalyst was kept below 25° C. with external ice cooling. After approximately one hour, the bulk of the reaction was completed, and the remainder of the reaction was allowed to go slowly to completion over an additional one-hour period. The product was diluted with 500 ml. of benzene and washed successively with several 500 ml. portions of water, 100 ml. portions of 5% sodium hydroxide until the washings were clear, and 100 ml. of 5% hydrochloric acid. The solution was dried over calcium chloride before stripping of the benzene solvent. The final oily product was polish filtered through a bed of diatomaceous earth. A clear colorless oil, $n_D^{30}=1.4610$, was obtained. A yield of 96.7% (366 g.) was obtained based upon the diethyl maleate used.

*Analysis.*—Calculated: sulfur 8.47%. Found: 8.54%.

EXAMPLE 2

Preparation of tetra-n-octyl thiodisuccinate

Di-n-octyl maleate 340 g. (2 moles) was treated as in Example 1 with hydrogen sulfide to saturate the cold ester. While maintaining the hydrogen sulfide saturation, 6 ml. of 25 percent sodium methoxide (0.026 mole) in methanol was added dropwise to the cold solution. Following the two hour reaction period, the product was worked upon a similar manner to obtain a clear colorless oil, $n_D^{30}=1.4639$, 98% yield based upon the amount of ester used.

*Analysis.*—Calculated: sulfur, 4.50%. Found: 4.99%.

EXAMPLE 3

Preparation of tetrabenzyl thiodisuccinate

Dibenzyl maleate 296 g. (1 mole) was added to 500 ml. of benzene and rapidly stirred, while hydrogen sulfide was diffused through the mixture in order to saturate it. The temperature was maintained below 25° C. throughout the saturation and reaction. While maintaining hydrogen sulfide saturation, 6 ml. of 25 percent sodium methoxide (0.026 mole) in methanol was added dropwise. After the two hour reaction period, the reaction mixture was washed with water, 5% sodium hydroxide (200 ml. portions), 200 ml. 5% hydrochloric acid, and then dried over calcium chloride. The solution was treated with carbon before the solvent was removed. The product (302 g.) solidified to a white waxy solid. The yield was 96.5% of theory.

*Analysis.*—Calculated: sulfur, 5.27%. Found: 5.17%.

EXAMPLE 4

Preparation of tetra n-octadecyl thiodisuccinate

Dioctadecyl maleate 250 g. (0.83 mole) was added to one liter of benzene and saturated with hydrogen sulfide. With rapid stirring and external ice cooling to 20° C., 14 ml. of 25 percent sodium methoxide (0.061 mole) in methanol was added dropwise while maintaing hydrogen sulfide saturation of the solution. The reaction was complete in 3.5 hours. The reaction product was washed with 200 ml. portions of 1% sodium hydroxide and with warm water. After drying over calcium chloride, the solvent was removed. The resulting oil was added to one liter of cold acetone. The product, a white powder, was obtained. A yield of 98.1% of theory was obtained.

*Analysis.*—Calculated sulfur, 2.52%. Found: 2.40%.

EXAMPLE 5

Preparation of mixed $C_6$, $C_8$ and $C_{10}$-tetraalkyl thiodisuccinate

Maleic acid was esterified in the usual manner using Alfol 610® as the mixed alcohol source. The analysis of Alfol 610® is 20 percent $C_6$-alkanol, 35 percent $C_8$-alkanol and 44 percent $C_{10}$-alkanol, an average molecular weight of 135. The resulting diAlfol 610® maleate had a boiling point range of 140 to 175° C. at 50–80 microns.

DiAlfol 610® maleate 340 g. (0.916 mole) was saturated with hydrogen sulfide at 15° C. While maintaining the temperature at 20–25° C. and saturating the solution with hydrogen sulfide, 8 ml. of 25 percent sodium methoxide (0.036 mole) in methanol was added. The reaction was complete in 2 hours. The product was diluted with an equal volume of benzene and then washed in a similar manner as described in the previous examples. After removal of the solvent, the product (349 g.) was polish filtered to yield a clear oil. There was obtained 98% of theory as based upon the mixed esters.

*Analysis.*—Calculated: sulfur, 4.32%. Found: 4.40%.

The possibility of easily preparing the mixed esters of Example 5 is of particular interest. If offers a liquid composition of the higher ester analogs which is easy to handle and facilitates incorporation into various systems for application purposes.

It should be noted that the products obtained from the above-mentioned examples are essentially pure as obtained from the reactions and require very little purification as by molecular distillation. The compounds are colorless and analysis confirms their identity. The materials therefore can be used in this form without further purification.

Various changes and modifications may be made in the invention herein described as will be apparent to those skilled in the chemical arts. It is accordingly intended that the present invention shall only be limited by the scope of the appended claims.

I claim:

1. A process for producing a polyester of a monothiodipolycarboxylic acid comprising (1) adding an alkali metal alkoxide to a polyester of an α,β-unsaturated olefinic polycarboxylic acid in a liquid phase essentially saturated with hydrogen sulfide under substantially anhydrous conditions and at a temperature of between about —10° C. and about 30° C. and (2) recovering from the resultant mixture said polyester of a monothiodipolycarboxylic acid.

2. The process of claim 1 in which said alkali metal alkoxide is sodium methoxide.

3. The process of claim 1 in which said polyester of an α,β-unsaturated olefinic polycarboxylic acid has the structure

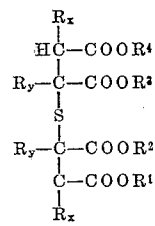

wherein $R_x$ may be either hydrogen, alkyl, a $$-CH_2COOR^1$$

group or a —CH(alkyl)COOR¹ group; $R_y$ may be either hydrogen, a lower alkyl group or a —CH(alkyl)COOR¹ group and combinations thereof of $R_x$ and $R_y$; $R_y$ being hydrogen or a lower alkyl when $R_x$ is either —CH₂COOR or —CH(alkyl)COOR¹, and $R_x$ being hydrogen, or an alkyl group when $R_y$ is —CH(alkyl)COOR¹ and $R^1$, $R^2$, $R^3$ and $R^4$ are the same or different alkyl, aralkyl, cycloalkyl, alkoxyalkyl, aryloxyalkyl, halogenated alkyl, or alkylene groups.

4. The process of claim 3 in which said alkali metal alkoxide is sodium methoxide.

5. The process of claim 3 in which said reaction is carried out at a temperature of 15° to 25° C. and said alkali metal alkoxide is sodium methoxide at a concentration of .01 to 1.0 mole percent, said sodium methoxide having been slowly added during said reaction of said hydrogen sulfide with said polyester.

References Cited

UNITED STATES PATENTS 2,668,847  2/1954  Newton _____ 260—2
2,845,390  7/1958  Kerschner _____ 260—481 XR

FOREIGN PATENTS 859,457  12/1952  Germany.

LORRAINE A. WEINBERGER, *Primary Examiner.*

M. G. BERGER, *Assistant Examiner.*